I. J. WISOFF.
SHOVEL.
APPLICATION FILED MAR. 18, 1921.
1,434,240.
Patented Oct. 31, 1922.
Fig. 1.
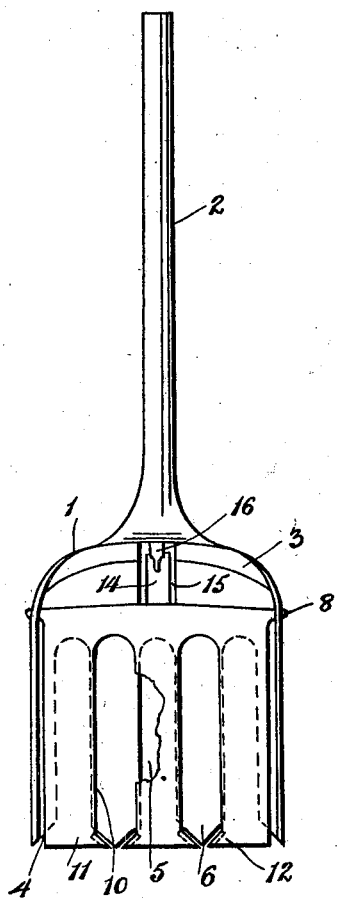
Fig. 2.
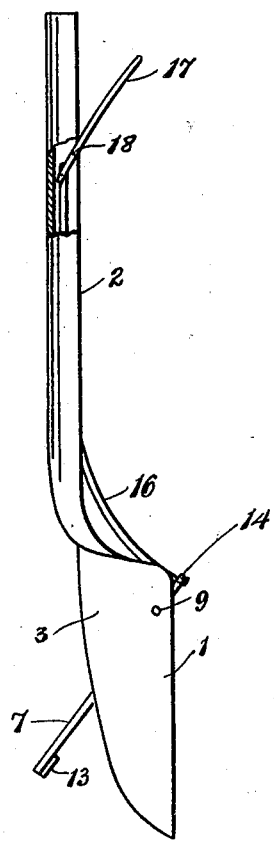
Fig. 3.
Inventor
ISAAC J. WISOFF.
By his Attorney
William F. Nickel Patented Oct. 31, 1922.

1,434,240

UNITED STATES PATENT OFFICE.

ISAAC J. WISOFF, OF BROOKLYN, NEW YORK.

SHOVEL.

Application filed March 18, 1921. Serial No. 453,235.

*To all whom it may concern:*

Be it known that I, ISAAC J. WISOFF, a citizen of the United States, residing in Brooklyn, in the county of Kings and State of New York, have invented certain new and useful Improvements in Shovels, of which the following is a specification.

This invention relates to an improvement in shovels; particularly a shovel adapted to be used for taking ashes from stoves and furnaces.

An object of this invention is to provide a shovel which can be used at will as an ordinary shovel and which is provided with a part to enable the shovel to be employed as a gripping implement, if need be, for the removal of hot coals and cinders.

Other objects and advantages of this invention will appear from the following description, taken with the accompanying drawings; which show the best form of my invention now known to me; and the novel features of the invention will be defined in the appended claims. This disclosure, however, is explanatory only and I may change the construction actually illustrated, especially as to shape, size and arrangement of the various parts, to the full extent indicated by the general meanings of the terms in which the appended claims are expressed.

On the drawings—

Figure 1 is a top view of a shovel according to my invention;

Figure 2 is a side view thereof; and

Figure 3 is a front view of same.

The same numerals identify the same parts throughout.

In the detailed description of the drawings, the numeral 1 indicates the body or scoop of the shovel to which is attached the handle 2, the scoop having flanges at the sides and back, indicated by the numeral 3. The bottom 4 may be provided with longitudinal slots 5 extending inward from the front edge, so as to divide the bottom into a number of prongs 6. The handle 2 of the shovel is channel-shaped in cross-section for a purpose that will presently be set forth: and the scoop 1 and the handle 2 may be made out of stamped sheet metal cut and bent into the required shape, and strengthened to any desired extent in any suitable manner.

Carried by the scoop 1 is a pivoted member or jaw 7. This jaw 7 is provided with projections or journals 8, extending from its opposite rear corners and engaging bearing openings 9 in the side flanges 3 of the scoop 1 near the back thereof. These openings are located as close to the bottom 4 of the scoop as possible, so that the jaw can lie flat on the bottom, or swing upward therefrom on the projections 8 as pivots. This jaw 7 may likewise be made by stamping out a piece of metal, and it may be formed to have slots 10 extending inward from the front edge thereof; like the slots 5, so as to provide prongs or tines 11 similar to the prongs 6 in the scoop 1 of the shovel. When the jaw lies flat on the bottom of the scoop 1, the prongs 11 of the jaw do not coincide with the prongs 6 of the bottom 4, but overlie the slots 5 in the bottom. Hence, when the shovel is to be used as an ordinary shovel, the bottom is practically continuous; and the shovel can be used to remove ashes without likelihood of the scoop portion losing any of its contents by leaking or dropping through the bottom. If desired the ends of the prongs 11 of the jaw 7 may be expanded so as to fit more completely in between the pointed ends of the prongs 6 of the scoop 1 of the shovel; the expanded ends being indicated by the numerals 12 and the edges 13 of these expanded ends may be turned downward so as to fit between the pointed ends of the prongs 6 if desired. When the shovel is then used as an ordinary shovel, these expanded ends 12 and edges 13 will prevent the wedging of ashes and cinders or other substances between the pointed ends of the prongs 6 and the ends of the prongs 11; and the jaw 7 will then not be likely to be forced upward when the shovel is thrust into a bank or pile of ashes to fill the scoop.

The rear edge of the jaw 7 is provided with an extension 14 which passes through an opening 15 at the back flange of the scoop 1 and is preferably connected to a link 16. This link is housed for the greater part of its length in the channel-shaped handle 2 and is pinned at its rear end to a lever 17. This lever 17 is pivoted at 18 in the opposite sides of the channel-shaped handle at a suitable distance from the rear end of the handle. When this lever is moved so that its lower end is swung towards the body 1, the jaw 7 is forced downward to rest against the bottom 4; and when it is moved in the opposite direction, the jaw is opened.

In practice the handle of the shovel is gripped by the hand of the user so that the lever 17 rests between the ends of two fingers. By pressing the lever 17 forward the shovel can be used as an ordinary shovel but if it should be desired to pick up a cinder or hot coal the lever 17 can be made to push the link 16 forward to lift or open the jaw 7. A cinder or coal, for example, can then be gripped between the jaw and the prongs 6 and lifted, to be dropped or deposited wherever required.

The construction of the shovel is quite simple and it can be cheaply made. It is easy to manufacture and the presence of the jaw does not prevent the shovel from being used as an ordinary shovel under all conditions for which an ordinary shovel is needed.

Of course, the shovel can be made in various sizes and utilized for other purposes than merely removing coals, cinders or ashes; and in fact for any situation where a gripping element is required to lift or displace any object that requires to be moved.

Having described my invention, what I believe to be new and desire to secure and protect by Letters Patent of the United States, is:—

1. A shovel comprising a scoop having a handle, the bottom of the scoop having prongs, and a jaw member pivotally secured to the scoop adjacent the bottom thereof, and having prongs in position to overlie the spaces between the prongs of the scoop.

2. A shovel comprising a scoop and a channel-shaped handle attached thereto, the scoop having a bottom comprising prongs the points of which are located at the front ends of the scoop, a jaw member pivotally carried by the scoop above the bottom thereof and having prongs in position to overlie the spaces between the prongs in the bottom of the scoop, a link pinned to the jaw member and housed by the channel-shaped handle, and an operating lever pinned to the link and pivotally carried in the channel-shaped handle of the shovel.

In witness whereof, I have signed my name to this specification, the 15th day of March, 1921.

ISAAC J. WISOFF.